United States Patent
Goldenberg et al.

(10) Patent No.: US 9,641,731 B2
(45) Date of Patent: May 2, 2017

(54) UNSTABLE MAGNETIC RELUCTANCE ACTUATOR

(71) Applicant: Corephotonics Ltd., Tel-Aviv (IL)

(72) Inventors: Ephraim Goldenberg, Ashdod (IL); Gal Avivi, Haifa (IL); Gil Bachar, Tel-Aviv (IL); Yehonatan Mandel, Kiryat-Ata (IL); Itay Yedid, Karme Yosef (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 15/081,889

(22) Filed: Mar. 27, 2016

(65) Prior Publication Data

US 2016/0337590 A1 Nov. 17, 2016

Related U.S. Application Data

(60) Provisional application No. 62/161,474, filed on May 14, 2015.

(51) Int. Cl.
*H04N 5/225* (2006.01)
*H02K 33/00* (2006.01)
*G02B 27/64* (2006.01)

(52) U.S. Cl.
CPC ......... *H04N 5/2251* (2013.01); *G02B 27/646* (2013.01); *H02K 33/00* (2013.01); *H04N 5/2253* (2013.01); *H04N 5/2254* (2013.01); *H04N 5/2257* (2013.01)

(58) Field of Classification Search
CPC .. H04N 5/2251; H04N 5/2257; H04N 5/2253; H04N 5/2254; H02K 33/00; G02B 27/646
See application file for complete search history.

(56) References Cited

U.S. PATENT DOCUMENTS

| | | | |
|---|---|---|---|
| 8,731,390 B2 | 5/2014 | Goldenberg et al. | |
| 2010/0232161 A1* | 9/2010 | Aschwanden | G02B 3/14 362/278 |
| 2013/0128099 A1* | 5/2013 | Gutierrez | G02B 7/08 348/349 |
| 2014/0063331 A1* | 3/2014 | Goldenberg | G03B 3/10 348/357 |
| 2014/0333829 A1* | 11/2014 | Lee | H04N 5/2251 348/373 |
| 2015/0318772 A1* | 11/2015 | Jahshan | H02P 23/00 318/400.41 |

(Continued)

FOREIGN PATENT DOCUMENTS

WO PCT/IB2014/062836 A1 5/2015

*Primary Examiner* — Shahbaz Nazrul
(74) *Attorney, Agent, or Firm* — Nathan & Associates Patent Agents Ltd; Menachem Nathan

(57) ABSTRACT

A magnetic reluctance actuator (MRA) comprising an unstable magnetic reluctance motor (MRM) having a strong force-to-position dependency and a nonlinear force-to-current dependency, the unstable MRM operative to move a lens carrier in a given direction, a lens position sensing mechanism, and a control unit configured to obtain an input from the position sensing mechanism and to provide closed loop control to overcome the strong force-to-position dependency and the nonlinear force-to-current dependency, thereby allowing precise lens position control.

7 Claims, 4 Drawing Sheets

(56) References Cited

U.S. PATENT DOCUMENTS

| | | | |
|---|---|---|---|
| 2016/0142634 A1* | 5/2016 | You | G03B 29/00 348/208.2 |
| 2016/0209618 A1* | 7/2016 | Avivi | G03B 3/10 |
| 2016/0258736 A1* | 9/2016 | Bachar | H04N 5/2254 |

* cited by examiner

UNSTABLE MAGNETIC RELUCTANCE ACTUATOR

CROSS REFERENCE TO RELATED APPLICATIONS

This application is related to and claims priority from U.S. Provisional Patent Application No. 62/161,474 filed May 14, 2015 and having the same title, which is incorporated herein by reference in its entirety.

FIELD

Embodiments disclosed herein relate in general to electromagnetic (EM) actuators having ferromagnetic members and conductive coils and more particularly to EM actuators used in miniature cameras.

BACKGROUND

In its basic form, an electronic camera, such as digital still camera or a camera embedded in a mobile phone (cellphone or smartphone) or in a tablet computer includes two components: (1) a lens module comprising a set of one or more plastic or glass lens elements and used to create an optical image of the viewed scene, and (2) an image sensor (e.g. CMOS or CCD), which converts the optical image to the electronic domain, where the image can be processed and stored. There are different types of electronic (or digital) cameras ranging by application (e.g., regular SLR, cameraphone, automotive, security and medical) and by functionality (e.g., with or without auto-focus). The simplest cameras are those in which the lens module is fixed in position with respect to the image sensor. These cameras are often called fixed-focus cameras, where the camera is focused to a pre-determined distance. Objects that fall within the depth of field (DOF) of the camera can be captured sharply and those which fall beyond the DOF will be blurred. In more advanced cameras, the position of the lens module (or at least one lens element in the lens module) can be changed by means of an actuator and the focus distance can be changed in accordance with the captured object or scene. In these cameras it is possible to capture objects from a very short distance (e.g., 10 cm) to infinity. Some advanced camera designs may include different groups of lenses that can move with respect to each other and hence change the effective focal length of the camera, which results in optical zoom capability. The trend in digital still cameras is to increase the zooming capabilities (e.g. to 5×, 10× or more) and, in cellphone cameras, to decrease the pixel size and increase the pixel count. These trends result in greater sensitivity to hand-shake or in a need for longer exposure time. This has created a need for optical image stabilization (OIS), which now appears in advanced cameras. In OIS-enabled cameras, the lens or camera module can change its lateral position or tilt angle in a fast manner to cancel the hand-shake during the image capture.

In compact (miniature) camera modules, the most ubiquitous form of an actuator is the Voice-Coil Motor (VCM), which includes a coil (wire turned on a cylinder), fixed (or "permanent" or "hard") magnets and springs. When current is driven through the coil, an electro-magnetic (EM) force is applied and the lens module changes position. While the VCM is considered a mature technology, it is costly, large in size, uses rare-earth magnets, is slow in operation and consumes high power.

Co-owned PCT patent application PCT/IB2014/062836 teaches a different type of actuator that essentially replaces the permanent magnet(s) of a VCM with one or more ferromagnetic members. Such an actuator is termed herein a "magnetic reluctance actuator" (MRA). The MRA disclosed in PCT/IB2014/062836 is "stable". In a stable actuator, if the actuator is moved from a position of magnetic/mechanic force equilibrium and then released, without a change in the coil current, it will return to the same equilibrium point. In an unstable MRA under the same condition, the actuator will return to a completely different point (usually a start or end point). This is caused by the strong change of magnetic force with position (gap size).

SUMMARY

In an embodiment there is provided an actuator for a miniature camera, comprising an unstable magnetic reluctance motor (MRM) having a strong force-to-position dependency and a nonlinear force-to-current dependency, the unstable MRM operative to move a lens carrier in a given movement direction; a lens position sensing mechanism; and a control unit configured to obtain an input from the position sensing mechanism and to provide closed loop control to overcome the strong force-to-position dependency and the nonlinear force-to-current dependency, thereby allowing precise lens position control.

In an exemplary embodiment, the MRM includes a stationary actuation core and a moving actuation bar.

In an exemplary embodiment, the actuation core and the actuation bar are each U-shaped and made of a ferromagnetic material.

In an exemplary embodiment, the lens position sensing mechanism includes a stationary sensing ferromagnetic member and a moving sensing ferromagnetic bar, the moving actuation bar and sensing ferromagnetic bar being rigidly coupled to the lens carrier.

In an exemplary embodiment, the actuation core and the actuation bar have respective actuation operating surfaces in planes perpendicular to the lens carrier movement direction.

In an exemplary embodiment, the stationary sensing ferromagnetic member and the moving sensing ferromagnetic bar have respective sensing operative surfaces in planes parallel to the lens carrier movement direction.

In an exemplary embodiment, the input from the lens position sensing mechanism includes a degree of overlap between the sensing member and sensing bar operative surfaces.

BRIEF DESCRIPTION OF THE DRAWINGS

Non-limiting embodiments are herein described, by way of example only, with reference to the accompanying drawings, wherein.

DETAILED DESCRIPTION

Figure 1A:
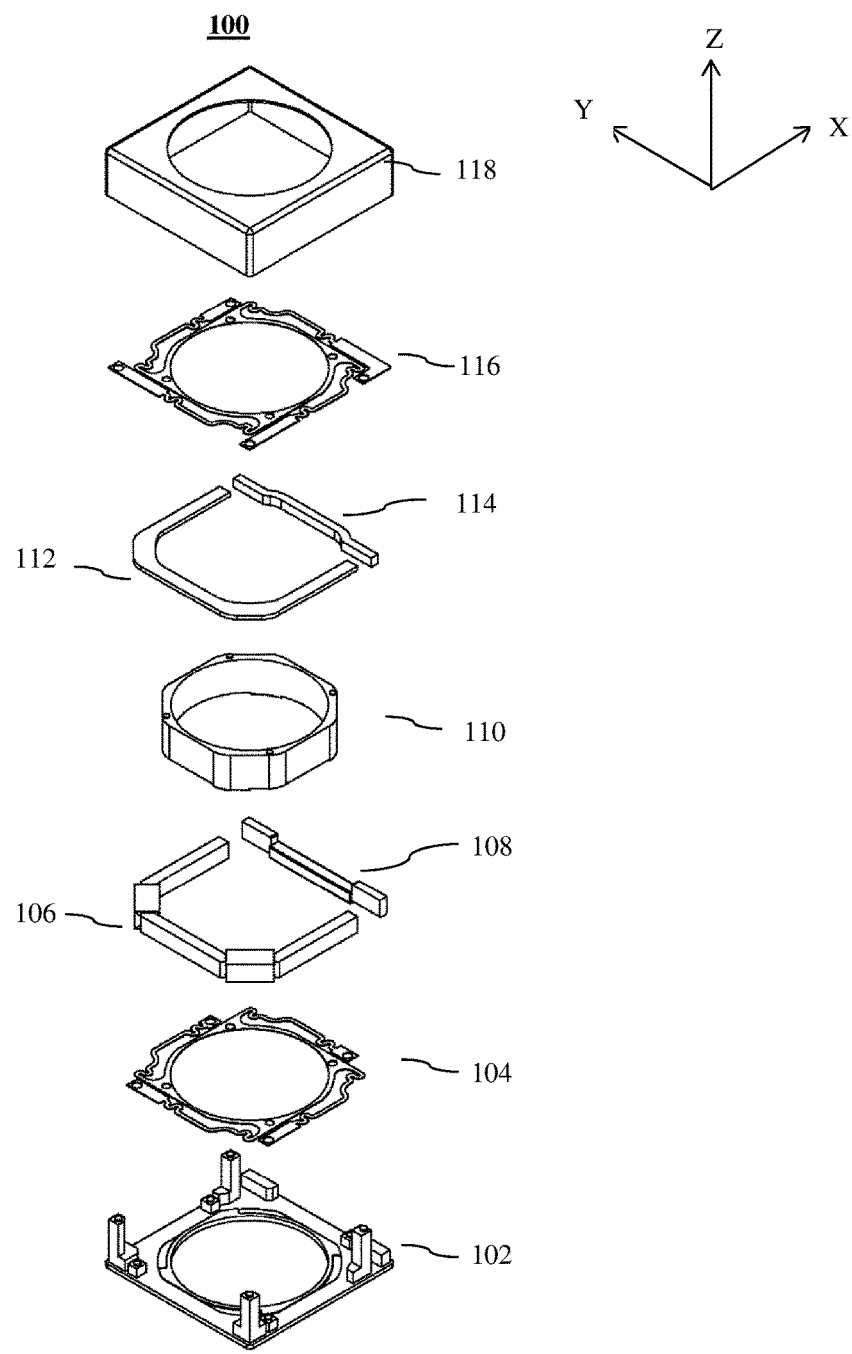
FIG. 1A shows in an exploded view an embodiment of an unstable magnetic reluctance actuator (MRA) disclosed herein.
Figure 1B:
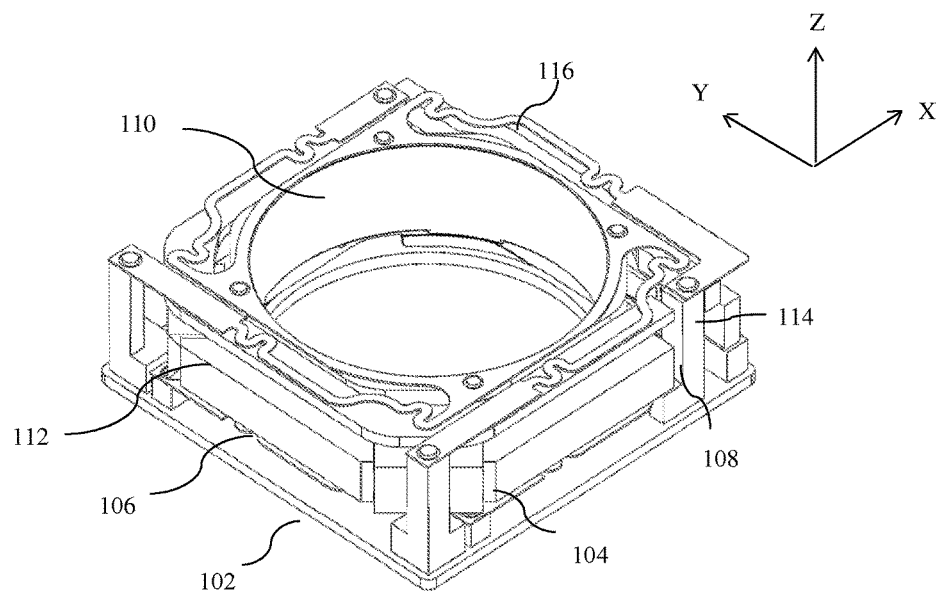
FIG. 1B shows the MRA of FIG. 1A in an isometric view (without case 118)

FIG. 1A shows in an exploded view an embodiment of an unstable magnetic reluctance actuator (MRA) disclosed herein and numbered 100. FIG. 1B shows the MRA in an isometric view. The X-Y-Z coordinate system shown in FIGS. 1A and 1B holds for all other figures described below. MRA 100 comprises a base 102, a lower spring 104, an actuation related stationary and exemplarily U-shaped ferromagnetic frame (also referred to as "actuation core") 106, a sensing stationary ferromagnetic member 108 (one part of a "lens position sensing mechanism"), a lens barrel carrier (or simply "lens carrier") 110, an actuation related moving and exemplarily U-shaped ferromagnetic frame (also referred to as "actuation bar") 112, a sensing ferromagnetic bar 114 (another part of a lens position sensing mechanism), an upper spring 116 and a case 118. Stationary frame (actuation core) 106 and moving frame (actuation bar) 112 form a magnetic reluctance motor (MRM) 120.

Figure 1C:
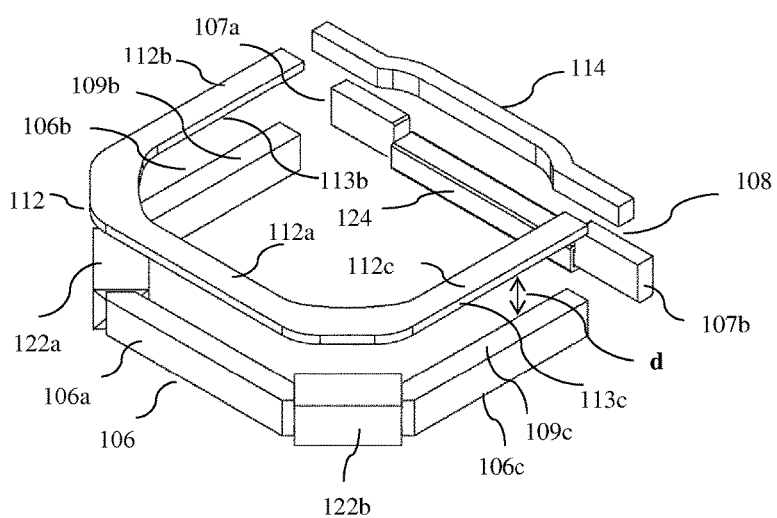
FIG. 1C shows the magnetic elements of the magnetic actuation motor (MRM) and the sensing elements of the position sensing mechanism in the MRA of FIG. 1.

FIG. 1C shows the magnetic elements of MRM 120 and the sensing elements of the position sensing mechanism. Stationary frame 106 includes a base 106a and two arms 106b and 106c which have respective operative surfaces 109b and 109c. Two sections of the ferromagnetic frame (here, exemplarily, corners between the base and each arm) are cores at least partially surrounded by a respective coil, here coils 122a and 122b. Sensing stationary ferromagnetic member 108 includes a central core at least partially surrounded by a coil 124 and two end sections 107a and 107b. Moving ferromagnetic frame 112 includes a base member 112a and two arms 112b and 112c which have respective operative surfaces 113b and 113c. Operative surfaces 109b, 109c, 113b and 113c may be referred to as "actuating" operative surfaces. Pairs of operative surfaces of the stationary and moving ferromagnetic frames face each other across a gap d (along the Z axis). Stationary ferromagnetic frame 106 and stationary ferromagnetic member 108 are rigidly coupled to the base 102, but are not related magnetically. Moving frame (actuation bar) 112 and sensing ferromagnetic bar 114 are rigidly connected to lens barrel carrier 110 and to the two springs 104 and 116. Gap d between stationary frame 106 and moving frame 112 changes with the movement of frame 112. Gap d can vary between an initial value of d0 (usually on the order of 200-500 μm) and 0, i.e. ending in contact between stationary frame 106 and moving frame 112.

Sensing member 108 and bar 114 have at least one respective operative surface, the operative surfaces facing each other across a small gap $d_1$. As shown in FIG. 1C and exemplarily, member 108 has two operating surfaces 108a and 108b (on respectively end sections 107a and 107b) and bar 114 has two operative surfaces 114a and 114b (see also section A-A in FIG. 2 and section B-B in FIG. 3). Operative surfaces 108a, 108b, 114a and 114b may be referred to as "sensing" operative surfaces. The sensing operative surfaces are parallel to a lens carrier movement direction (exemplary the Z direction in FIGS. 1A-1C, 2 and 3) and are perpendicular to the actuating operative surfaces.

In operation, current applied to coils 122a and 122b develops an EM force F in the Z direction. F is approximately proportional to $A(I \times N)^2/(B+d)^2$ where I is the current, N is the number of coil wire turns and B is a constant that depends on the geometry and material of the device. The relationship above expresses a nonlinear force-to-current dependency and a strong force-to-position dependence. The magnetic force pulls ferromagnetic frames 106 and 112 toward each other, reducing the gap size and thereby minimizing the magnetic reluctance. The lens carrier and sensing bar 114 move in tandem with moving frame 112.

Evidently, when the gap d is small, F is very large. However, for larger gaps, e.g. gaps satisfying d>B, F decreases quickly as d increases. A counterforce S may be provided by spring 104 and 116. For a particular current, an equilibrium formed between the EM force and the spring force leads to a particular gap size. However, while F is approximately proportional to $1/d^2$, S is proportional to d0-d (i.e. is linear), where d0 is an initial gap between the actuation core 106 and the actuation bar 112.

The different dependencies on d lead to two major problems: the range of significant EM force is small, and the gap can collapse. Therefore, the structure of MRA 100 is inherently "unstable" as defined in the Background. Moreover, the structure and conventional operation of MRM 120 is on its own "unstable", and therefore, MRM 120 is referred to herein as an "unstable MRM".

A solution designed to circumvent the different "d" dependencies of the EM force and the spring force described above was suggested in co-owned U.S. Pat. No. 8,731,390 titled "Electromagnetic actuators for digital cameras". The solution therein connected the stationary and moving ferromagnetic members to a common hinge and provided a relative movement between the two members as a rotation movement around the hinge. Each member had at least one operative surface substantially parallel to the movement direction. Opposing operating surfaces on the stationary and moving ferromagnetic members faced each other across a gap d'. In operation, a current applied to a coil surrounding at least partially one of the members developed an EM force F approximately proportional to $S(I \times N)^2/(B+d')$. The force caused the operative surfaces to slide relative to each other, changing the overlap area but leaving d' constant. The overlap is minimal in a first relaxed ("open") state and increases with the current I to a maximal overlap that represents a "closed" state. To a first approximation, the EM force depended essentially only on the current (i.e. is independent of position). This provided easier control of the position of the lens carrier.

Figure 2:
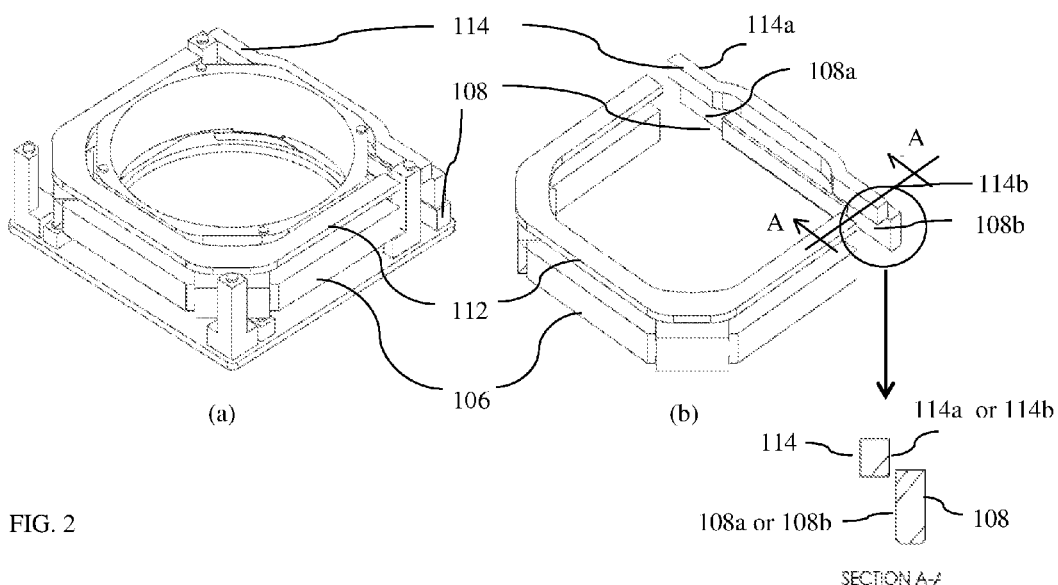
FIG. 2 shows in (a) the MRA and in (b) the MRM in a first operating position.
Figure 3:
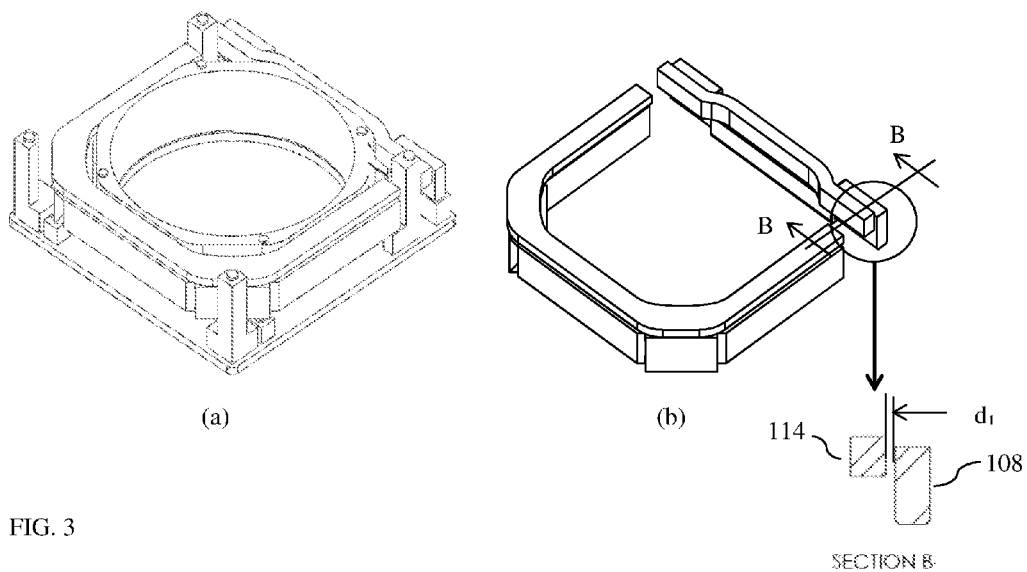
FIG. 3 shows in (a) the MRA and in (b) the MRM in a second operating position.
Figure 4:
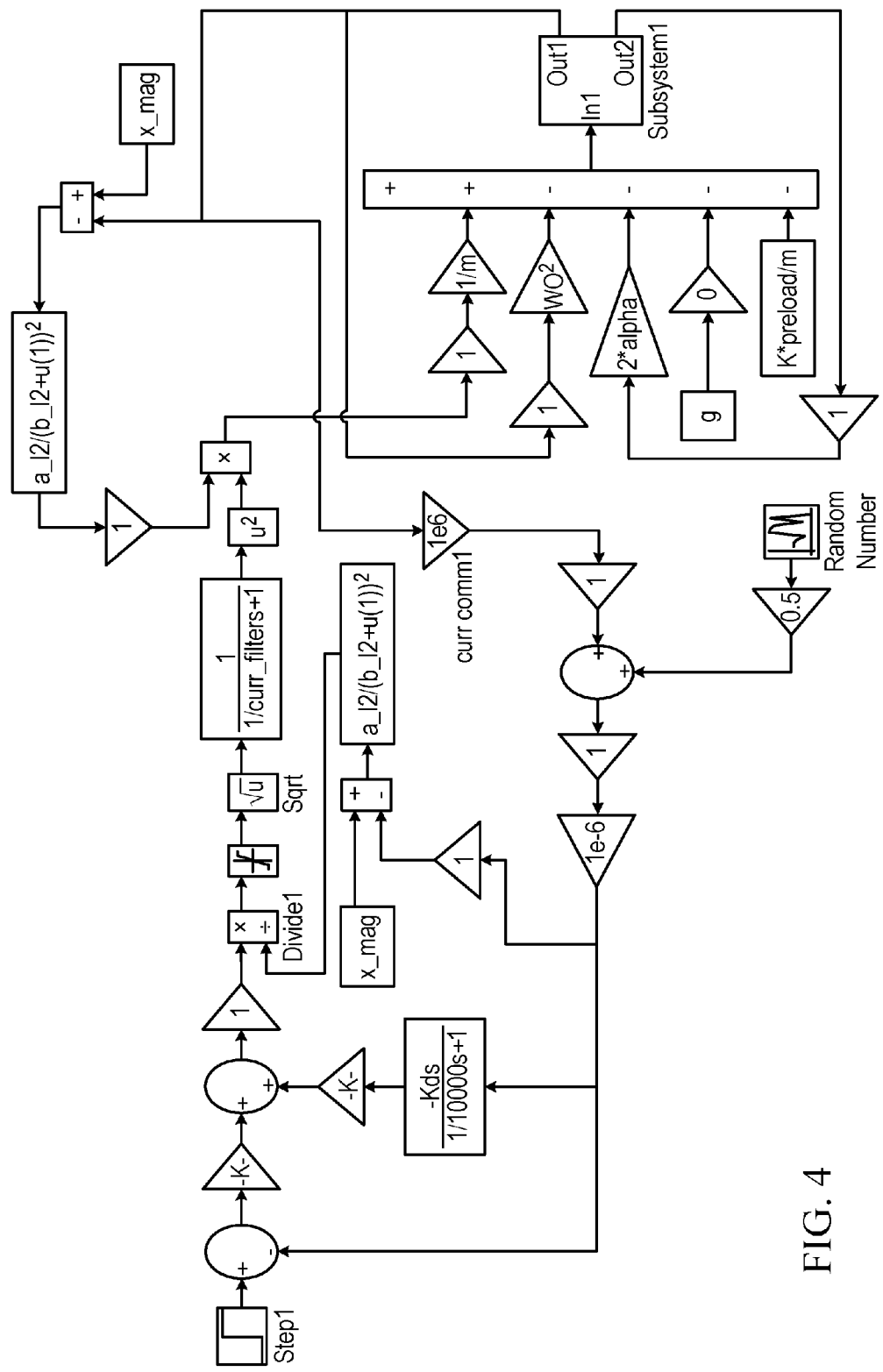
FIG. 4 shows an embodiment of a control circuit for the MRA.

The present inventors have determined that the problem of an inherently unstable MRA (such as MRM 120), i.e. of the small range of significant EM force and the collapse of gap d may be solved by providing a position sensing mechanism comprising sensing stationary ferromagnetic member 108 and sensing ferromagnetic bar 114, and by further providing a closed loop control circuit coupled electrically to the position sensing circuit and to the MRM, exemplarily as shown in FIG. 4. FIG. 2 shows in (a) the MRA and in (b) the MRM in a first operating position, in which the gap d is large and the overlap between the operative surfaces of sensing stationary ferromagnetic member 108 and sensing ferromagnetic bar 114 is small. FIG. 3 shows in (a) the MRA and in (b) the MRM in a second operating position in which the gap d is small and the overlap between the operative surfaces of member 108 and bar 114 is large. The degree of overlap (indicative of the relative position of member 108 and bar 114) may be sensed, providing the position of the lens.

The position sensing may be performed using an inductance method as described in co-owned PCT patent application PCT/IB2014/063245 titled "Inductance-based position sensing in a digital camera actuator". The output of the position sensing is fed to a control circuit, which provides a feedback to a current feeding circuit controlling the current through coils 122*a* and 122*b*. The closed loop control may be exemplarily provided by a control circuit shown in FIG. 4. All elements and symbols therein would be known to one of ordinary skill in the art and are therefore not described in further detail.

Regarding closed loop control, it is a known art to achieve closed loop control in a simple linear system (SLS) with the following characteristics: 1) position is measured constantly; 2) the magnetic force is linear with respect to the coil current, and 3) the restoring mechanical force is linear with spring stretch. In the system of actuator (MRA) 100, conditions (1) and (3) are fulfilled, but the magnetic force is strongly dependent on position and is not linear with coil current. However, since for each position and given current the magnetic force is known (through use of appropriate mathematical formulas), it is possible to transform actuator 100 into a simple linear system, as shown schematically by FIG. 4. For example, in a SLS, a "next step" magnetic force F is basically calculated using an "existing (current or present) F", lens position and lens speed as well as the required next lens position and lens speed. In this case F=a×I where "a" is a constant and I is the coil current. Since the controller can directly control only I, the "next step I"="next step F/a", and "existing F"="existing I×a". In exemplary actuator 100, the same F control algorithm can be implemented, however in this case "existing F" can be calculated by a more complex relation such as $F=A(I \times N)^2/(B+d)^2$ and in a similar way "next step I" can be calculated from "next step F".

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. An actuator for a camera, comprising:
    a) an unstable magnetic reluctance motor (MRM) having a strong force-to-position dependency and a nonlinear force-to-current dependency, the unstable MRM operative to move a lens carrier in a given movement direction;
    b) a lens position sensing mechanism; and
    c) a control unit configured to obtain an input from the lens position sensing mechanism and to provide closed loop control to overcome the strong force-to-position dependency and the nonlinear force-to-current dependency, thereby allowing precise lens position control.

2. The actuator of claim 1, wherein the MRM includes a stationary actuation core and a moving actuation bar.

3. The actuator of claim 2, wherein the actuation core and the actuation bar are each U-shaped and made of a ferromagnetic material.

4. The actuator of claim 2, wherein the lens position sensing mechanism includes a stationary sensing ferromagnetic member and a moving sensing ferromagnetic bar, the moving actuation bar and sensing ferromagnetic bar being rigidly coupled to the lens carrier.

5. The actuator of claim 2, wherein the actuation core and the actuation bar have respective actuation operating surfaces in planes perpendicular to the lens carrier movement direction.

6. The actuator of claim 4, wherein the stationary sensing ferromagnetic member and the moving sensing ferromagnetic bar have respective sensing operative surfaces in planes parallel to the lens carrier movement direction.

7. The actuator of claim 6, wherein the input from the lens position sensing mechanism includes a degree of overlap between the sensing member and sensing bar operative surfaces.

* * * * *